March 19, 1968     T. GAUGHAN, JR     3,373,846
LOCKING DEVICE FOR ROPES AND SHEAVES
Filed April 14, 1966
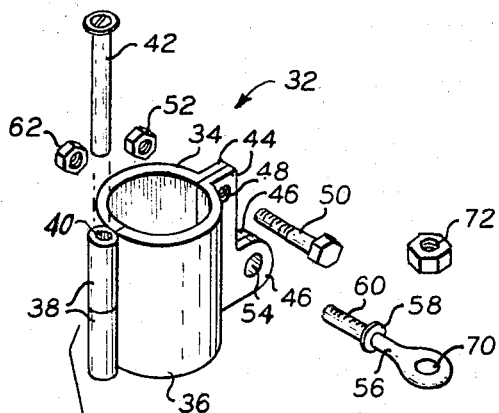
FIG. 2.
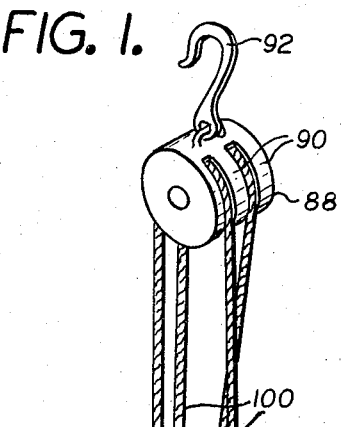
FIG. 1.
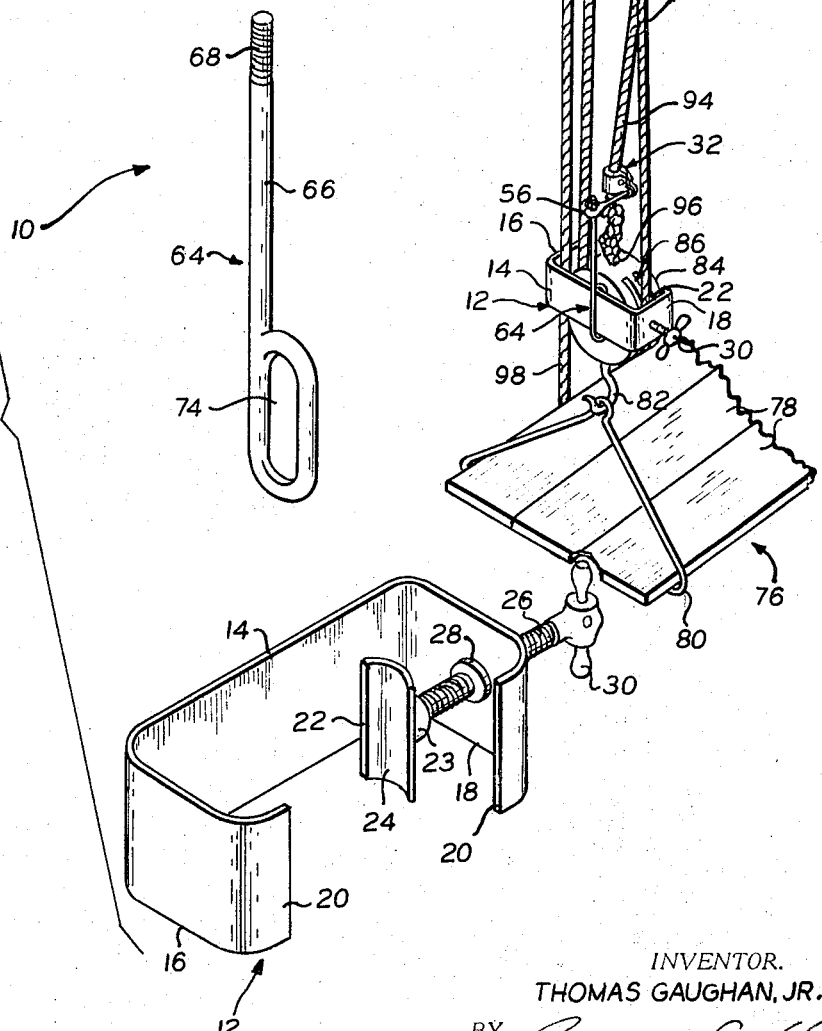
INVENTOR.
THOMAS GAUGHAN, JR.
BY
ATTORNEYS.

United States Patent Office 3,373,846
Patented Mar. 19, 1968

3,373,846
LOCKING DEVICE FOR ROPES AND SHEAVES
Thomas Gaughan, Jr., 89—51 237th St.,
Bellerose, N.Y. 11426
Filed Apr. 14, 1966, Ser. No. 542,637
8 Claims. (Cl. 188—64)

ABSTRACT OF THE DISCLOSURE

A locking device for ropes and the like extending about the sheave of a pulley wherein the device locks the ropes and sheave together from relative movement.

This invention relates to locking devices and more particularly to a locking device for the lines of a rope positioned about the sheave or sheaves of a pulley.

In most applications of pulleys or blocks and tackle, there is always a safety problem. The problem is to be certain that if any one of the falls or lines of the rope break, the remaining rope will not unwind such that the supported weight or load will be prevented from falling. This problem is particularly important in suspended scaffolding where a human life is involved.

Suspended scaffolds depend upon a single rope at each end for raising and lowering the whole scaffold. Each rope used on such scaffolds is strung and threaded about the sheaves of at least two spaced pulleys. These connect the pulleys together and the connections of the rope are usually called the "lines" or "falls." After a period of use, such lines or falls become frayed and sometimes tear and separate. When this occurs, the rope lines quickly unwind from the pulleys and the suspended scaffold falls.

The desideratum of this invention is to provide a safety or rope locking device that will overcome the aforementioned problems. Because of the relative simplicity of the present invention, it is made inexpensively and is easy to apply and use without requiring special mechanical skills upon the part of the user, thus making the invention more attractive for use by scaffold workers.

Another object of the invention is to provide a locking device for use on ropes that will act directly on the lines of the rope where they extend about the sheave of the pulley. In this manner, the rope lines and sheave are all locked together from relative movement thereby preventing possible unwinding of the rope lines remaining after a break occurs somewhere in the length of the rope.

Another object of the invention is to provide a rope locking device that engages and locks at least two lines of the rope from relative movement while being suspended from a third line to accomplish this function.

Still another object and feature of the invention resides in the structural details of the locking device that enable the parts to be positioned adjacent the lines of the rope and is such a substantial and encompassing relationship to the pulley that the invention cannot be accidentally withdrawn or displaced from the pulley, but can only be removed by the scaffold worker himself when and if the need arises.

Other and further objects of this invention reside in the structures and arrangements hereinafter more fully described with reference to the accompanying drawing in which:

FIG. 1 is a perspective view of a locking device constructed according to the invention as applied to pulleys supporting a scaffold, and FIG. 2 is an exploded perspective view of the details of the locking device.

Referring now to FIG. 2 of the drawing, the locking device of the present invention is shown in expanded or exploded view and is generally identified by the numeral 10. The locking device includes a clamp generally identified by the numeral 12 that has a substantially C-shape. The clamp member 12 has an elongated body 14 that extends transversely between and terminates at its opposite ends in spaced arms 16 and 18. The arms 16 and 18 are substantially parallel to each other in their spaced relationship and substantially perpendicular to the body 14. These arms each terminate in a finger 20 that extends transversely toward the other and substantially parallel to the body 14. The ends of the fingers 20 terminate short of each other to provide an opening therebetween.

In use, the arm 16 functions to engage a rope on its inner surface, namely, that surface which faces toward the interior of the clamp 12. Hence, for convenience of explanation and reference, because the arm 16 is fixed relative to the remainder of the clamp, it may be termed a fixed rope engaging member. The oppositely disposed arm 18 mounts a movable clamp element or rope engaging member 22 that has a longitudinally extending concave surface 24. The inner rope engaging surface of the arm 16 and the rope engaging surface 24 are substantially parallel and extend essentially vertically.

The rope engaging member 22 has a swivel connection 23 with the end of an actuating screw 26 that is threadedly mounted within a threaded bearing 28 securely housed in the arm 18. The member 22 is operatively adjusted or moved toward and away from its opposed cooperating rope engaging surface 16 by manual operation of a handle 30 provided on the exposed opposite end of the screw 26. In practice, the transverse space between the arms 16 and 18 is such as to easily accommodate a pulley therebetween in a manner to be described.

Included as a part of the locking device 10 is a line grip or gripper member generally identified by the numeral 32. The line grip member 32 is conveniently formed in two longitudinally extending arcuately shaped parts 34 and 36, each of which may be termed gripper elements. Each of the gripper elements is adapted to pivot about a hinge section 38 formed at their backs. The hinge sections 38 each has a hole or aperture 40 that is adapted to receive a pivot pin or hinge bolt 42 therein.

Opposite the hinge sections and provided on each of the gripper elements 34 and 36 is an external ear 44 that terminates at its lower end in an enlarged lobe 46. The upper end of each ear 44 has a hole 48 which are adapted to be aligned and to receive a securing bolt 50. The threaded end of the bolt 50 that extends through the holes 48 is secured in place by a threaded nut 52. The enlarged lobs 46 are similarly provided with aligned holes 54 that receive, for extension therethrough, an eye bolt 56.

The eye bolt 56 has a stop or limiting surface 58 that is enlarged greater than the diameter of the bolt to engage with a facing surface of the adjacent lobe 46 while the thread 60 thereof projects through and beyond the other side of the holes 54. A nut 66 is adapted to secure the eye bolt 56 in the lobes 46 as described. The nuts 52 and 62 may be adjusted on the cooperating threads of the bolts 50 and 56 respectively to vary the space between the inner longitudinally extending arcuate faces of the elements 34 and 36.

Included within the rope locking device structure is a spacing support means identified by the numeral 64 that comprises an elongated rod-like body 66. The body 66 terminates at its upper end in a thread 68 that is adapted to fit in and extend through the eye 70 of the eye bolt 56. The end of the thread 68 that extends through the eye 70 is adapted to be secured in this extended position by a threaded nut 72. Adjustment of the nut 72 along the length of the thread 68 will cause the spacing support means 64 to move up or down and, consequently, raise or lower with respect to the eye bolt and also the line grip 32 with which it will then be connected at its upper end. The lower or opposite end of the body 66 is provided with a loop or oval-shaped connector opening 74. The connector opening 74 is of such height and width as to be adapted easily to receive the body 14 of clamp 12 in a manner to be described.

Referring now to FIG. 1, there is shown a portion of a scaffold structure generally identified by the numeral 76. The scaffold here shown is for illustrative purposes only and for ease of explanation of the use of the invention and, therefore, should form no limitation upon the scope or use of the present invention. As is common in scaffolds of the type illustrated, the boards 78 are supported by a yoke-like element 80 at each of its ends. The yoke 80 is adapted to be supported from a hook 82 that extends downward from a pulley 84 that has at least a sheave 86 included as a part thereof. The lower pulley 84 is connected with an upper pulley 88 which has one or more sheaves 90. The upper end of the pulley 88 may have a hook 92 from which the same may be supported from a higher support.

A rope is connected between the plurality of pulleys such as shown at 84 and 88 such that its main line 94 is connected by a convenient knot to a fixed connection 96 on the lower pulley 84. The main line 94 then extends upward about a sheave 90 of the upper pulley 88 then around and down about the sheave 86 of the lower pulley 84 and then up again to a second sheave 90 of the upper pulley 88 and downward therefrom to terminate in a king line 98. It is the king line that is used by the scaffold worker to raise or lower the scaffold. The remaining lines 100 are known as the falls or fall lines.

The present invention is adapted to be employed in connection with any pulley structure, but is illustrated more easily for use with the scaffold structure 76 shown in FIG. 1. In practice, the finger 20 of the arm 16 of the clamp 12 is inserted into and through the oval-shaped connecting opening 74 of the spacing support means 64 until the loop 74 is positioned substantially centrally along the length of the body 14. The upper threaded end 68 of the support means 64 is extended through the eye 70 of the eye bolt 56 and retained therein by the application of the nut 72 to the threads 68 so that the clamp 12 is now suspendingly supported in a position spaced down from and remote to the line grip 32.

The line grip 32 is then adapted to be secured to the main line or fall 94 of the rope. The line grip 32 is adapted to be positioned about the rope by permitting the gripper elements 34 and 36 to pivot at their hinge 38, 40 so they may engage tightly with the fall 94 at their conforming arcuate interiors. The gripper elements 34 and 36 then are fastened together by the re-application of the bolts 50 and 56 causing the gripper elements to tightly engage the rope therebetween. The bolts 50 and 56 retain the gripper elements 34 and 36 in fixed relationship with the main line 94 preventing the line grip 32 from moving relative to the main line 94 after having been once fixed in position.

The line grip 32 is so securely positioned on the main line 94 above the pulley 84 such that the clamp 12 will be supportingly suspended therebelow to at least substantially encompass the pulley 84 and its sheave 86, as well as the fall lines 100 on the sheave and the king line 98. When so positioned, the clamp 12 prevents the possible disengagement of the fall lines 100 from the sheave and requires that the king line 98 pass between the rope engaging member 16 and the pulley 84. The exact relationship of the clamp 12 with respect to the pulley 84 can be determined and adjusted by raising or lowering the spacing support member 64 with respect to the eye bolt 56. This is accomplished by adjustment of the nut 72 up or down along the thread 68.

Thus, the arms 16 and 18 of the clamp 12 will be positioned adjacent the sheave of the pulley 84 in such manner that the rope engaging members 16 and 22 can be positioned adjacent to the fall lines 100 that extend about the sheave 86 of the pulley 84. It will be recognized that once the line grip 32 is fixed in position to the fall line 94, it will not need to be moved by the scaffold worker. In like manner, when the clamp 12 is adjusted in its adjacent encompassing relationship to the pulley 84, it no longer requires adjustment, but is always ready for quick and easy use.

Each time the scaffold 76 is raised or lowered to its desired height by the application of forces on the king line 98, the locking device 10 is then operated by the scaffold worker. To do this, the worker need merely turn the handle 30 which applies a force against the adjacent fall line 100. This causes the body 14 of the clamp to move in a direction toward the handle 30 thereby pulling the arm 16 and its inner rope engaging surface against its adjacent fall line 100. After a sufficient number of turns on the handle 30, both rope engaging members 16 and 22 will engage their respective fall lines 100 causing such fall lines to move tightly into engagement with the respective surface of the sheave 86.

After sufficient adjustment of the handle 30 is made the fall lines 100 become tightly engaged with the respective surfaces of their sheave 86 so that neither the sheave nor the engaged fall lines can move relative to each other. Hence, if a break in any one of the fall lines of the rope connecting the two pulleys 84 and 88 together should occur, only that one fall line will separate at the break. The remaining fall lines will be prevented from moving relative to their sheaves because of the presence of the clamping and locking effect that has been accomplished on the fall lines 100 and the sheave 86 by the locking device 10.

Obviously, when the fall lines 100 are locked together from relative movement and also are locked to the sheave 86 from relative movement to it, these fall lines cannot unwind from the pulley 84, and, therefore, cannot unwind from the sheaves 90 of the pulley 88. Therefore, the present working device provides a safety device for use in connection with pulleys wherein at least two of the fall lines 100 are locked from relative movement and from movement relative to the sheave 86 of the pulley 84 about which they extend. Moreover, the fall lines are locked from relative movement to the third fall line 94 of the rope so that at least three lines of the rope are always secured and locked together from relative movement to each other and from movement relative to the pulley to which they are connected.

Because the clamp 12 is always retained in its encompassing relationship adjacent to and about the pulley 84, it cannot be accidentally displaced therefrom. In addition, because it is always so positioned, its use is convenient to the scaffold workman. It is out of his way. It does not encumber his movements and, therefore, provides no restriction or limitation upon the workman or the manner in which he must perform his work. When it is desired to operate the fall lines of the pulley rope, it is merely necessary to manipulate the handle 30 of the clamp 12 to release the forces applied to the rope by the engaging means 16 and 22 to enable the ropes to move freely once again. The positioning of the king line 98 between the rope engaging means 16 and the pulley 84 enables the king line to be clamped and locked from movement relative to the pulley during the locking operation of the handle 30.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. A locking device for the lines of a rope on a pulley comprising
   a clamp operable to lock a plurality of lines of the rope and the pulley against movement,
   a line grip to fixedly grip still another line of the rope remote from said clamp,
   and support means connected with said line grip and supporting said clamp from said line grip in position for operation to lock the plurality of lines of the rope against relative movement.

2. A locking device as in claim 1,
   said clamp having a fixed arm,
   a clamp member on said clamp operatively movable toward and away from the fixed arm to cause said fixed arm and clamp member each to engage and lock respective ones of a plurality of the lines of the rope against movement relative to the pulley.

3. A locking device as in claim 1,
   said support means having means at one end thereof connected with said clamp and adjustment means at the other end thereof connected with said line grip to adjust the position of said clamp remote from and relative to said line grip to enable said clamp to operate to lock the plurality of lines of the rope against movement relative to the pulley.

4. A locking device as in claim 2,
   said line grip including relatively pivoted gripper elements movable between open and closed positions,
   securing means cooperable with said gripper elements to secure the same in their closed positions about the other line of the rope, and said support means including means adjustably cooperable with said securing means to adjustably support said clamp from said line grip in a position distant from said line grip.

5. In a locking device for a rope having a line flexedly connected with a pulley and having the lines extending about the pulley sheave,
   a clamp,
   said clamp having spaced arms each adjacen a respective side of the pulley sheave,
   rope engaging means on one of said arms,
   rope engaging means movable on another of said arms and spaced from said first rope engaging means,
   said movable rope engaging means being movable toward and away from said first rope engaging means to vary the space between said rope engaging means to cause both of said rope engaging means to engage the lines of the rope extending about the pulley sheave on their respective sides of the sheave to lock the same from movement relative to each other and to the pulley sheave and from movement relative thereto.

6. In a locking device as in claim 5,
   said clamp having a body to be positioned adjacent a face of a pulley and connected with said spaced arms to position the same adjacent respective sides of the sheave,
   and fingers on each of said arms directed toward each other to be positioned adjacent another face of the pulley opposite said body whereby said clamp substantially encompasses the pulley and its sheave.

7. In a locking device as in claim 5,
   a line grip to be releasably secured to the rope line fixedly connected with a pulley,
   and support means connected between said line grip and clamp to support said clamp from said line grip to position said arms adjacent their respective sides of the pulley sheave.

8. In a locking device as in claim 7,
   adjustable connecting means between said support means and line grip to enable adjustment of said support means relative to said line grip to adjustably support said clamp to position said arms adjacent said pulley sheave.

References Cited
UNITED STATES PATENTS

| | | | |
|---|---|---|---|
| 519,615 | 5/1894 | McLead | 188—64 X |
| 725,048 | 4/1903 | Cutting | 24—125 |
| 3,204,726 | 9/1965 | Kerman | 188—65.2 |

MILTON BUCHLER, *Primary Examiner.*

G. E. HALVOSA, *Assistant Examiner.*